Figures 4, 5:
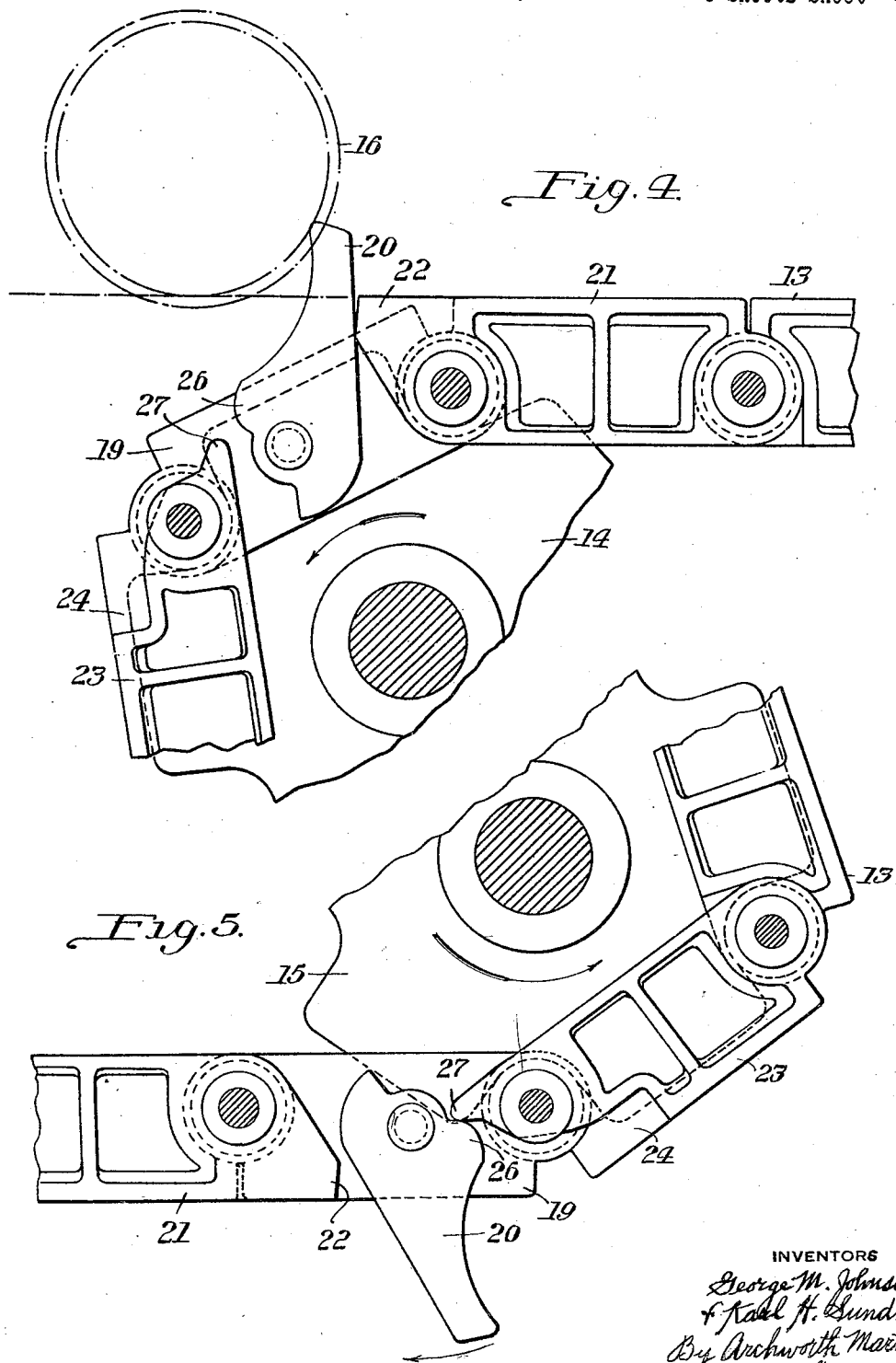

Oct. 2, 1928.                    1,686,382
G. M. JOHNSON ET AL
CAR TRANSFER APPARATUS
Filed Feb. 9, 1927            3 Sheets-Sheet 1
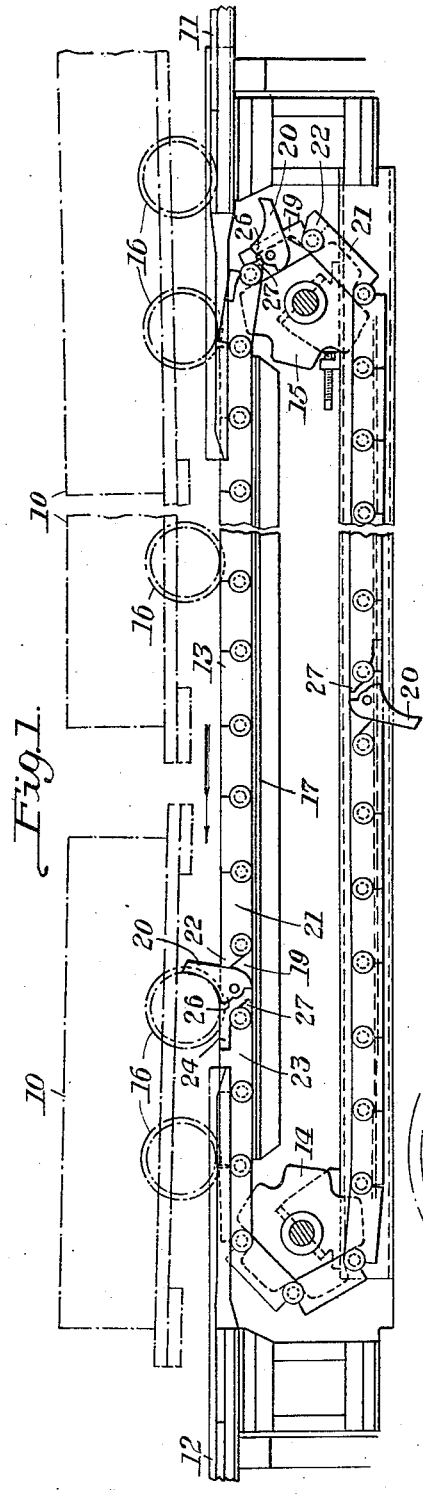
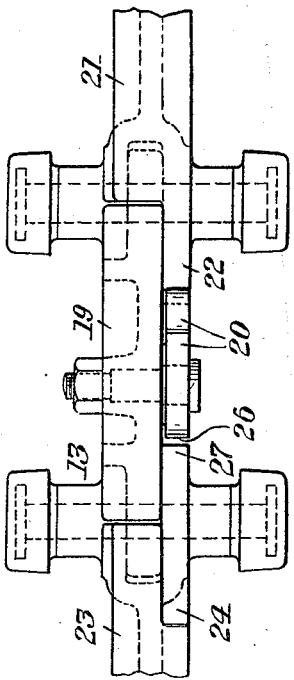
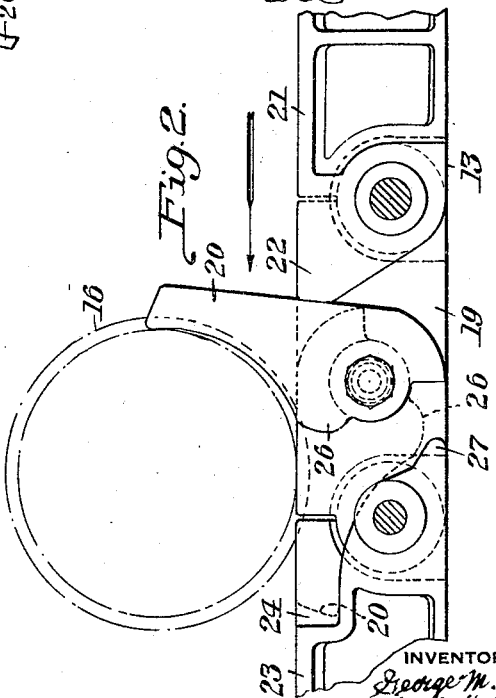
INVENTORS
George M. Johnson
& Karl H. Gundrik
By Archwotth Martin,
Attorney.

Oct. 2, 1928.  G. M. JOHNSON ET AL  1,686,382
CAR TRANSFER APPARATUS
Filed Feb. 9, 1927   3 Sheets-Sheet 2

INVENTORS
George M. Johnson
f Karl H. Sundvik
By Archworth Martin
Attorney

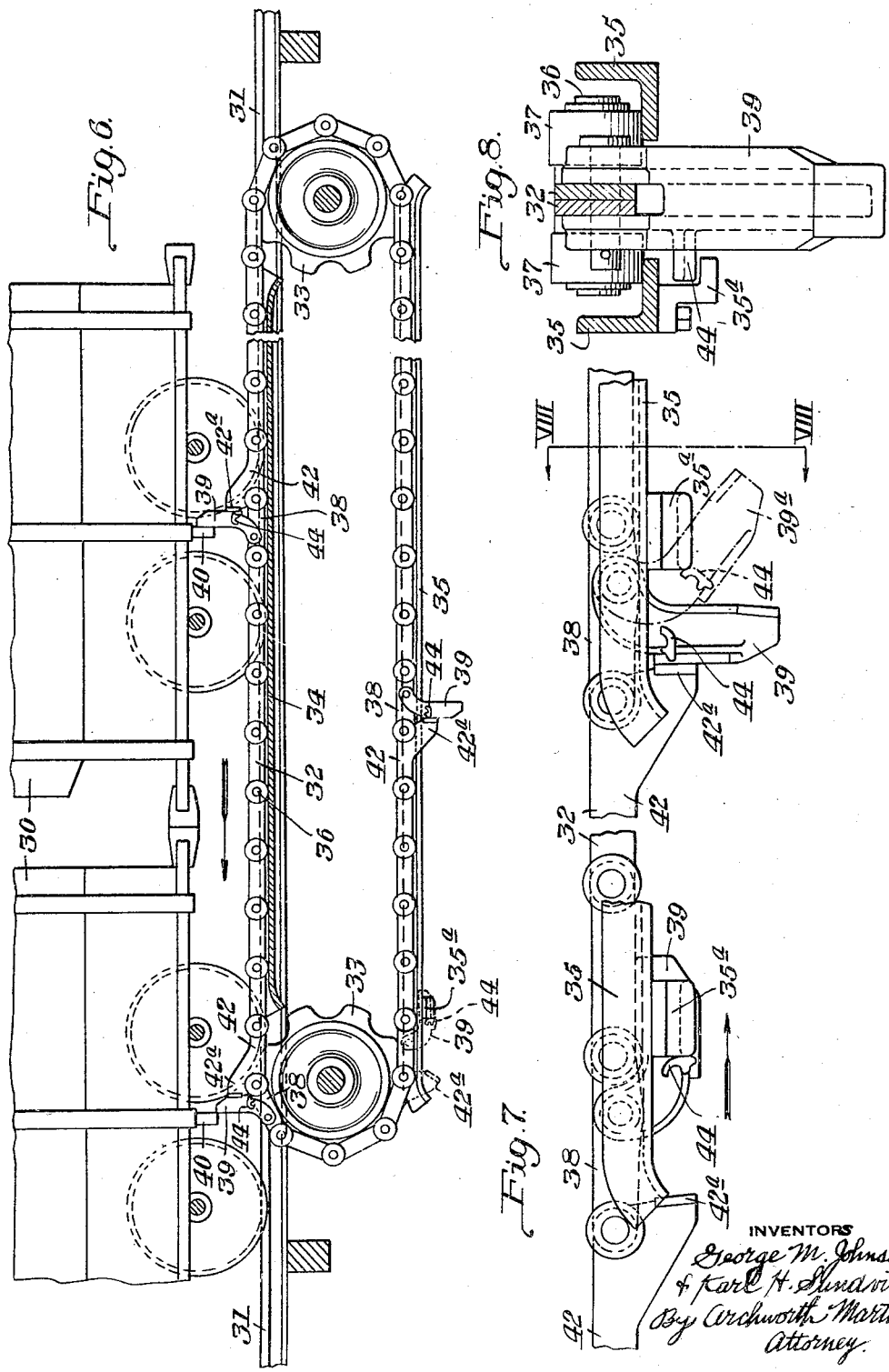

Patented Oct. 2, 1928.

1,686,382

UNITED STATES PATENT OFFICE.

GEORGE M. JOHNSON AND KARL HENRIK SUNDVIK, OF JEANNETTE, PENNSYLVANIA, ASSIGNORS TO FORT PITT MINE EQUIPMENT COMPANY, OF PITTSBURGH, PENNSYLVANIA, A CORPORATION OF PENNSYLVANIA.

CAR-TRANSFER APPARATUS.

Application filed February 9, 1927. Serial No. 166,977.

Our invention relates to transfer apparatus, and more particularly to that type wherein certain links of a chain are provided with stop members that assist in transporting vehicles or other articles for which the chain serves as a conveyer.

As herein described, our invention relates more particularly to the transporting of wheeled vehicles such as mine cars, from a given level to another level that is either in a higher or a lower plane, through the medium of chains, some of whose links are provided with stop members for engaging the wheels or other portions of the vehicles.

The invention is of particular utility in connection with chain rail conveyers such as that described in the George M. Johnson application, Serial No. 733.528, issued on July 12, 1927, as Patent No. 1,635,276, wherein the links of each of the pair of chains have their upper portions in the form of rail sections upon which the flanged wheels of a car may be supported, certain of the links being provided with pivoted stop members that engage the car wheels to hold the car against movement relative to the conveyer chains when being transported thereby.

Another manner in which our invention, or certain portions thereof, may be employed, is in connection with what are known as "chain hauls" wherein cars are moved by a conveyer chain along an inclined track rail.

One object of our invention is to provide car-stop members or horns on conveyer chains, so arranged that at the forward end of the upper, or car-supporting, flight of the conveyer, the stop will not be tilted forwardly when the horn-carrying link starts around the sprocket wheel, thus avoiding acceleration of the car at such point, with consequent strain upon the conveying mechanism.

Another object of our invention is to provide means for positively moving pivoted stop horns to operative position when approaching the upper flight of the conveyer, in case such horns have become stuck in inoperative position upon depression thereof by a locomotive or other vehicle having been moved along the conveyer independently of the movement of the conveyer.

Another object of our invention is to simplify and improve generally the structure and operation of chain conveyer apparatus.

Some of the forms which our invention may take are shown in the accompanying drawing, wherein Figure 1 is a sectional view, in side elevation, of chain rail apparatus embodying our invention; Fig. 2 is a side elevational view, on an enlarged scale, of a portion of the apparatus of Fig. 1; Fig. 3 is a plan view of the apparatus of Fig. 2; Fig. 4 is a side elevational view, on an enlarged scale, showing the position assumed by certain links of the conveyer when passing around the left hand sprocket wheel of Fig. 1; Fig. 5 is a view showing the position assumed by the links when passing around the sprocket at the opposite end of the conveyer; Fig. 6 is a longitudinal sectional view of a chain haul system embodying our invention; Fig. 7 is a view of a portion of the lower chain flight of Fig. 6, on an enlarged scale, and Fig. 8 is a view on the line VIII—VIII of Fig. 7.

In Figs. 1 to 5 of the accompanying drawing, we have shown a conveyer of the chain rail type for transporting mine cars 10 from a fixed track 11, to a fixed track 12 that is located in a higher plane. It will be understood that the cars can be also transported from the track 12 to the tracks 11 by moving the conveyer in the direction opposite to that indicated by the arrow.

There are two sets of conveyer chains 13 that are laterally spaced, each of which passes around a pair of sprockets 14—15, the chains 13 being spaced apart a distance substantially equal to the gage of the car wheels 16. As Fig. 1 is mainly an elevational view, only one chain 13 is shown, it being understood that the chain 13 and the wheels 16 are duplicated at the other side of the apparatus, in the manner disclosed in the patent above referred to.

A bar 17 is provided intermediate the sprocket wheels 14—15, for guiding and affording vertical support to the links of the chain 13, such links being advanced along the bar by means of the sprockets 14 and 15 that are driven in any suitable manner, (not shown). Each chain 13 is composed of links whose head portions serve as rail sections that form, in effect, continuations of the rails 11 and 12, and certain links 19 have stop horns 20 pivotally connected thereto in position to engage the car wheels 16, thus carrying the cars along with the conveyer as the conveyer is advanced in the direction indicated by the arrow, or serving to hold the cars on the conveyer while moving it in the reverse direction, to lower the cars from the track 12 to the track 11.

The link 21 to the rear of each of the horn links 19 is provided with a forwardly-extending portion 22 that serves as a seat for the horn 20 as shown more clearly in Fig. 2. The link 23 that is located forwardly of each link 19 is cut out, as indicated at 24, so that when the horn 20 is depressed, as by a locomotive moving over the conveyer, in the direction indicated by the arrow, when the conveyer is stationary, the horn will be tilted about its pivot and its forward end lie within the recess 24, the straight edge of the horn 20 thus functioning as a rail-head member and providing additional supporting space for the treads of locomotive wheels, the weight at the forward end of the horn 20 being transmitted to the link 23.

The center of gravity of each horn 20 is so disposed relative to its pivot that when in the upper flight the horns will lie in depressed position after they have been moved thereto, either by running a locomotive over the conveyer in the direction indicated by the arrow or by being pushed down manually or otherwise, so that a locomotive can run freely back and forth over the conveyer, while the conveyer is stationary. When the conveyer is again put in motion, the horns will be automatically and positively projected to operative position in a manner to be hereinafter described.

It will be seen that if the horns 20 were rigidly supported against backward movement relative to their links 19, that such horns, when the links are leaving the upper flight and starting around the sprocket 14, would have an accelerated movement relative to the link by reason of the greater arc through which it would ordinarily travel. Such accelerated movement would be resisted by the inertia of the car being transported and an excessive strain would therefore be thrown upon the mechanism of the conveyer, as well as upon the car. It is for this reason that I provide the seating surface 22 upon the link 21, with the result that as a link 19 reaches the position shown in Fig. 4, the upper portion of the horn 20 is permitted to advance substantially synchronously with the link 21 by reason of its pivotal support upon the link 19 and its seating contact with the link 21. As the outer end of the link 19 descends, it will lower the horn 20 instead of tilting the same forwardly as would be the case if such horn were rigidly held against angular movement relative to the link. By the time the forward end of the link 21 descends to a considerable degree, the horn 20 will have been lowered out of contact with the car wheel.

It sometimes happens that the horns 20 are depressed so that their extremities lie within the recesses 24 as indicated by dotted lines in Fig. 2, through passage of a locomotive over the conveyer as above indicated, and the horns sometimes stick in such depressed position, through presence of sand or grit or for some other reason, so that it becomes necessary to project such horns to extended position where they can again serve as stop members for the car wheels. For this reason, we provide a shoulder 26 on each horn and a nose portion 27 on the rear end of each of the links 23, so that if the horn is lying in depressed position when the links 23 and 21 reach the sprocket 15 in approaching the upper flight of the conveyer, the tilting of the link 19 relative to the link 23 when entering the sprocket 15 as shown in Fig. 5, will cause the nose 27 to be thrust against the shoulder 26 and thereby turn the horn 20 in a clockwise direction about its pivot to the position indicated at the right hand end of Fig. 1, so that it will engage the car wheel 16.

In Figs. 6 to 8, we show one feature of the invention applied to chain haul apparatus, whereby cars 30 are drawn along inclined tracks 31, in the direction indicated by the arrow. A single chain 32 is provided that is driven by sprocket wheels 33, from any suitable source of power. Guide rails 34 and 35 are provided along the upper and lower flights of the chain, to support the same against vertical displacement. The links are preferably joined by pintles 36 (Fig. 8) that extend through overlapping ends of adjacent links, and each of which has a pair of rollers 37 journalled thereon that engage the guide rails and serve as anti-friction link-supporting members.

Certain of the links, designated by the numeral 38, have stop horns or pawls 39 pivotally connected thereto in such position that when they are supported in upright position, they will engage the cross bars 40 of the cars, to cause them to be advanced with the chain.

The link 42 immediately at the rear of each link 38 is provided with an upstanding portion 42ª that serves as a seat to support a horn 39 against rearward movement when pulling a car. In this case, as in the case of the horns 20 and links 21 of Figs. 1 to 5, a more rigid support is provided for the horn than if it were supported entirely by the link upon which it is pivotally mounted, and there is less deflection of the chain under pulling strains.

Furthermore, as in the case of the structure of Figs. 1 to 5, the horns 39 are not tilted forwardly when the links 38 reach the forward end of the upper conveyer flight, but are moved in a generally vertical direction away from the cross bars 40, as indicated by the left hand end of Fig. 6, thus avoiding acceleration of the cars, as heretofore explained.

In case the horns 39 stick in depressed position, as indicated at the left hand side of Fig. 7, after passage of a vehicle over the conveyer in the direction indicated by the arrow while the conveyer is stationary or after they have been manually depressed to permit movements of vehicles over the conveyer in either direction, we provide means for positively restoring such horns to projected or operative position. This means comprises a deflector lug 35ª that is secured to one of the guide bars 35 in position to engage a curved stop lug 44 that is carried by each horn 39. Thus if the horn is depressed as shown at the left hand end of Fig. 7, it will be engaged by the projecting flange of the lug 35ª and the horn pushed from the position shown at the left hand end of Fig. 7, past the position shown by dotted lines at the right hand end of Fig. 7 and finally caused to assume the projected position shown in full lines. When the horn is in fully projected position, its stop 44 will freely pass through the channel between the outer flange of the stop 35ª and the opposite flange of the guide bar 35.

We claim as our invention:—

1. Conveyer chain structure comprising links, a stop member pivotally mounted on one of said links, a link pivotally connected to the first-named link at a point rearwardly of the stop member, and a seating surface on the second-named link having a projection which extends to a point intermediate the two pivotal points and serving as an abutment for limiting pivotal movement of the stop member in one direction.

2. Conveyer chain structure comprising links, a stop member pivotally supported against one side of a link, a link pivotally connected to the first-named link at a point rearwardly of the stop member, and a projection on said link disposed alongside of the first-named link and serving as an abutment for limiting pivotal movement of the stop member in one direction.

3. Conveyer chain structure comprising links, a stop member pivotally mounted on one of said links and movable in one direction into parallelism with said link, and an adjacent link having a cut-out portion within which one end of the stop member lies when in said horizontal position.

4. Conveyer structure comprising links, a stop member movably mounted on one of said links, and means for moving said stop member relative to the said link, comprising a second link having a projection which is brought into operative engagement with the stop member when the said two links are moved in one direction relative to one another.

5. Conveyer structure comprising links, a stop member pivotally mounted upon one of said links, and means on an adjacent link for moving said stop member about its pivot when said links are flexed relative to one another.

6. Conveyer structure comprising a chain, a stop member pivotally mounted on the chain for oscillatory movement between angularly spaced positions, and means unitary with the stop member for yieldably holding it against movement from one of said positions to the other, during a portion of its path of travel with the chain.

7. Conveyer structure comprising a chain, a stop member pivotally mounted on the chain for oscillatory movement between angularly spaced positions, means unitary with the stop member for yieldably holding it against movement from one of said positions to the other, during a portion of its path of travel with the chain, and means for positively moving the stop from one of said positions to the other, at another point in its path of travel.

8. Conveyer structure comprising links, a stop member mounted on one of said links for forward tilting movement from an upright operative position to forwardly extending inoperative position, and means movable with the links for returning the stop member to upright position.

In testimony whereof we, the said GEORGE M. JOHNSON and KARL HENRIK SUNDVIK, have hereunto set our hands.

GEORGE M. JOHNSON.
KARL HENRIK SUNDVIK.